US006616840B1

(12) United States Patent
Boele

(10) Patent No.: US 6,616,840 B1
(45) Date of Patent: Sep. 9, 2003

(54) ROTARY SEPARATOR

(75) Inventor: Hendrik Arie Boele, Hank (NL)

(73) Assignee: Rowe Parsons International B.V., Hank (NL)

( * ) Notice: Subject to any disclaimer, the term of this patent is extended or adjusted under 35 U.S.C. 154(b) by 0 days.

(21) Appl. No.: 09/857,149
(22) PCT Filed: Dec. 1, 1998
(86) PCT No.: PCT/NL98/00679
§ 371 (c)(1),
(2), (4) Date: Aug. 30, 2001
(87) PCT Pub. No.: WO00/32297
PCT Pub. Date: Jun. 8, 2000

(51) Int. Cl.[7] ..................... B01D 33/073; B01D 45/14; B01D 46/28
(52) U.S. Cl. ............... 210/297; 210/315; 210/360.1; 210/380.1; 210/402
(58) Field of Search .............. 210/232, 297, 210/298, 314, 315, 360.1, 380.1, 380.3, 385, 391, 396, 402, 403, 407

(56) References Cited

U.S. PATENT DOCUMENTS 2,767,853 A * 10/1956 Saxe .................... 210/391
3,286,843 A * 11/1966 Kraissl, Jr. .............. 210/332
4,052,305 A * 10/1977 Arvanitakis .............. 210/791
4,224,166 A * 9/1980 Wyman .................. 210/396
5,183,568 A * 2/1993 Lescovich .............. 210/360.1
6,123,841 A * 9/2000 Gotoh .................... 210/169

FOREIGN PATENT DOCUMENTS

| DE | 1144999 | 3/1963 |
| DE | 216169 | 12/1984 |
| DE | 29716708 | 11/1997 |
| EP | 0331809 | 9/1989 |
| GB | 1408418 | 10/1975 |

* cited by examiner

*Primary Examiner*—Fred Prince
(74) *Attorney, Agent, or Firm*—Webb Ziesenheim Logsdon Orkin & Hanson, P.C.

(57) ABSTRACT

A device for separating one or more components from a fluid, such as gas, water, oil and so on, which device is provided with a closed drum-shaped first carrier which is rotatable driven on a shaft and has means for feeding respectively discharging the fluid, wherein a second carrier is arranged coaxially in the first carrier, on which second carrier are arranged a large number of flexible elements which extend radially from the second carrier as far as the first carrier, and the feed means are provided close to the one end of the second carrier and the discharge means close to the other end of the second carrier, so that when the fluid flows through the device a layered separation of the components results along a flexible element.

8 Claims, 6 Drawing Sheets

ROTARY SEPARATOR

BACKGROUND OF THE INVENTION

1. Field of the Invention

The invention relates to a device for separating one or more components from a fluid, such as gas, water, oil and so on, which device is provided with a closed drum-shaped first carrier which is rotatably driven on a shaft and has means for feeding respectively discharging the fluid.

2. Description of the Prior Art

It is known to separate components from a fluid by causing the fluid to rotate, whereby as a result of the centrifugal force the components are separated in layers around the rotation shaft, whereafter discharge thereof becomes possible and the fluid for axial discharge can for instance be further cleaned.

A drawback of such a system is that a layer does not form in uniform thickness over the periphery, whereby the centre of gravity of the layers does not coincide with the rotation shaft. Severe vibrations are caused as a result during rotation of the fluid.

SUMMARY OF THE INVENTION

Another drawback of such a system is that when the drum-shaped first carrier is slowed down only part of the layers in the fluid are slowed down and another part continues to rotate at about the same speed and continues to cause vibrations.

The object of the present invention is to provide a device of the above-described type wherein the above stated drawbacks are obviated.

This object is achieved according to the characterizing measures of claim 1, wherein a second carrier is arranged coaxially in the first carrier, on which second carrier are arranged a large number of elongate elements, preferably flexible, which extend radially or practically radially from the second carrier as far as the first carrier, wherein the feed means are provided close to the one end of the second carrier and the discharge means close to the other end of the second carrier.

The contaminated fluid fed into the rotating device via the feed means will flow transversely of the flexible elements to the discharge means and be subject to centrifugal forces. The flexible elements adapt to the flow forces and the centrifugal forces and cause a substantially laminar flow owing to the obtained form. This laminar flow causes the flow behind the preferably cylindrical flexible element to diminish as seen in the direction of flow. The contaminated particles for separation out of the fluid arrive in this diminished flow and are then substantially subject to the centrifugal forces. Under the influence of these forces and guided by the flexible elements, the particles move towards the rotation shaft or away from the rotation shaft depending on their specific weight relative to the specific weight of the surrounding particles. A separation of the contaminated particles in layers hereby occurs along a flexible element.

An advantage is that the particles separated in layers are held between the large number of flexible elements, whereby the greater part of the contaminants are removed from the fluid flowing to the outside via the discharge means. The outflowing fluid can be separated from even more particles by arranging filters in the discharge means.

Another advantage is that due to the laminar flow each deposited layer acquires a uniform thickness over the periphery, whereby, little vibration occurs.

Another further advantage is that during the continuous rotation or deceleration or acceleration of the drum the entire fluid with the contaminated particles is carried along whereby no great speed differences occur between the different layers and flake-like particles are not torn apart.

In a first embodiment a brush-like carrier is arranged in a drum-shaped carrier. By causing these carriers to rotate particles are separated from the contaminated fluid and held between the brush bristles.

In another embodiment the peripheral part of the drum-shaped carrier is releasable and axially displaceable. When the device becomes fouled by the contaminated particles it is herein possible to clean the brush-like carrier and the filter by centrifuging after removing the peripheral part, so that the device can be used again for cleaning fluid. Owing to the adhesive action between the particles and the brush the inner wall of the drum remains virtually clean after axial displacement.

BRIEF DESCRIPTION OF THE DRAWINGS

Above mentioned and other features of the invention will be further elucidated in the figure description hereinbelow of a number of embodiments.

DETAILED DESCRIPTION OF THE PREFERRED EMBODIMENTS

Figure 1:
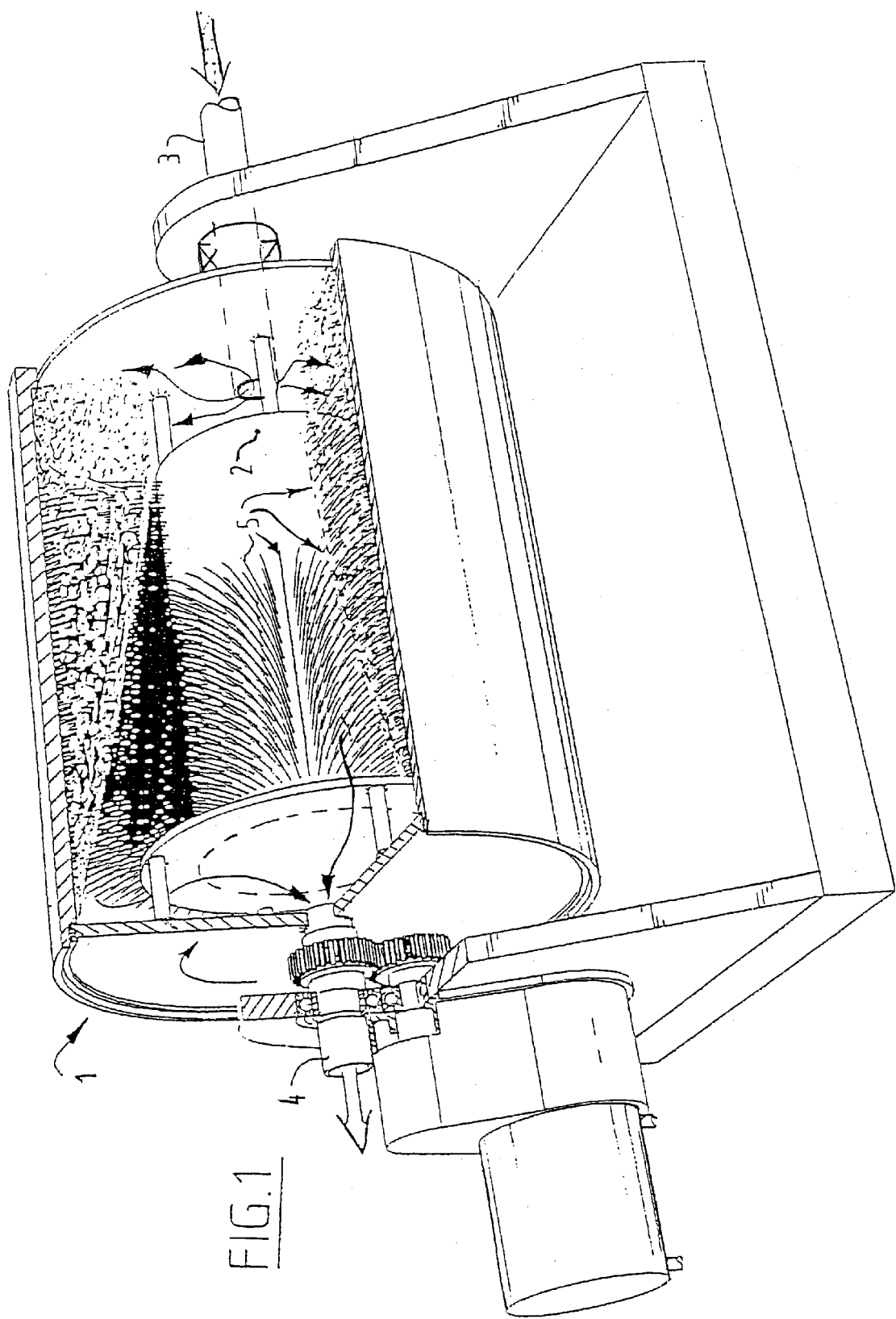
FIG. 1 shows a perspective view with partly broken-away parts of a first embodiment according to the invention.

In FIG. 1 a carrier 2 is fixedly arranged coaxially in a drum 1, on which carrier a large number of flexible elements 5 are provided. These elements 5 extend from carrier 2 up to the inner surface of the drum 1. On the one axial side of drum 1 is provided an inlet 3 and on the other side an outlet 4. The whole device is fixed for axial rotation and is driven by for instance an electric motor.

Fluid, for instance water, having therein particles for removal, for instance sand, is carried into rotating drum 1 via inlet 3. The contaminated fluid is accelerated herein and is subjected to a centrifugal force. The fluid flows in laminar manner transversely of flexible elements 5 and in the diminished flow behind elements 5 the particles are moved by the centrifugal force to drum 1 or carrier 2, depending on the specific weight.

The contaminated particles remain behind between flexible elements 5, while the fluid flows through to outlet 4.

Figure 2:
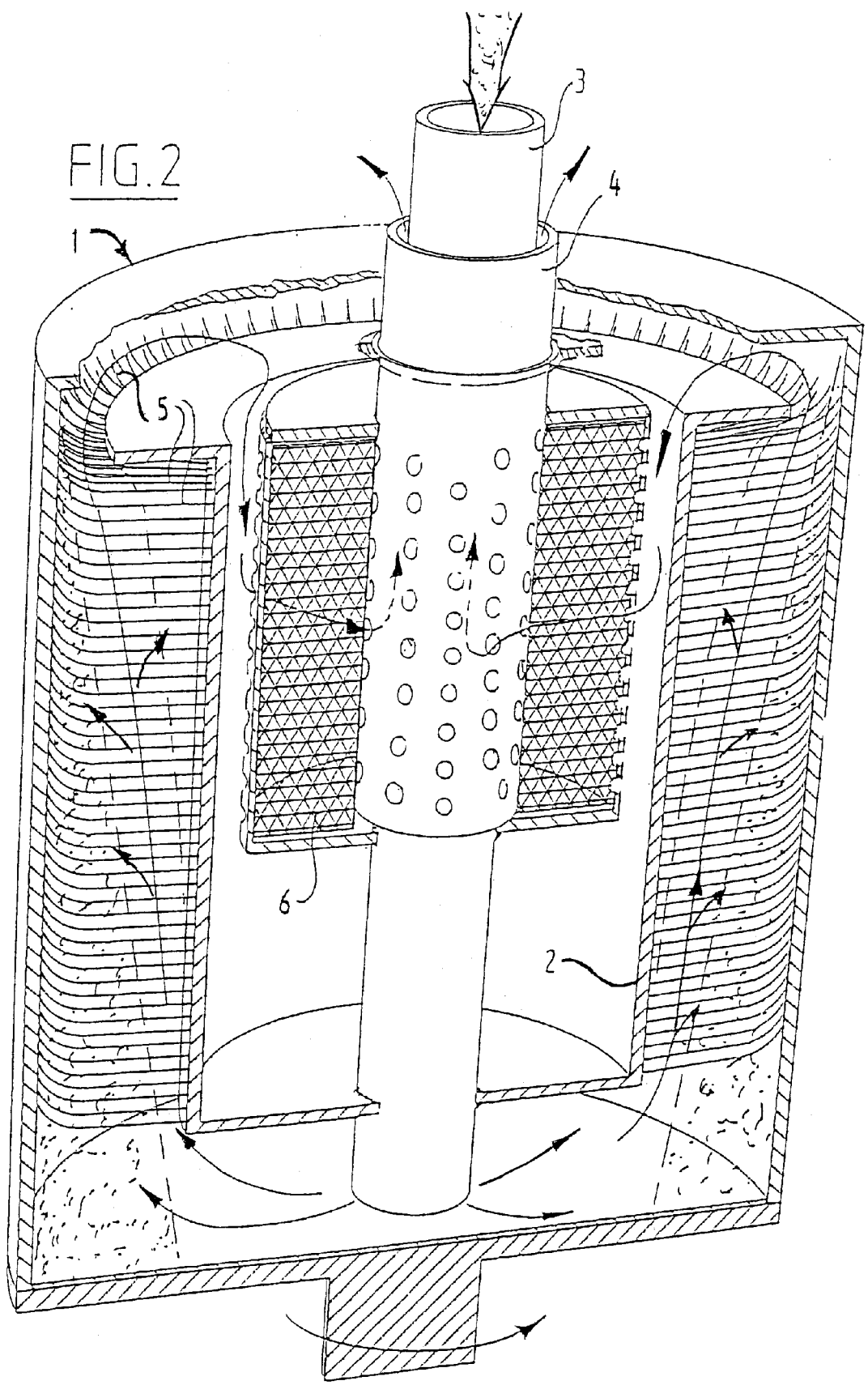
FIG. 2 shows an axial cross-section of a second embodiment according to the invention.

In FIG. 2 a coaxial carrier 2 is likewise fixedly arranged, but vertically disposed, in a drum 1, on which carrier a large number of flexible elements 5 is provided. Further provided on an axial side and protruding into carrier 2 are a number of filter elements 6 and a feed pipe 3.

In this embodiment contaminated fluid is also carried into the drum via inlet 3 and flows under the influence of centrifugal forces along flexible elements 5, where a large part of the contaminants remain behind.

Only a small part of the contaminants remains behind in the fluid. This then flows to filter elements 6 where particles of determined size are still filtered out of the fluid. The particle size in the effluent can also be determined herewith, which may be important for the further treatment.

Figure 3:
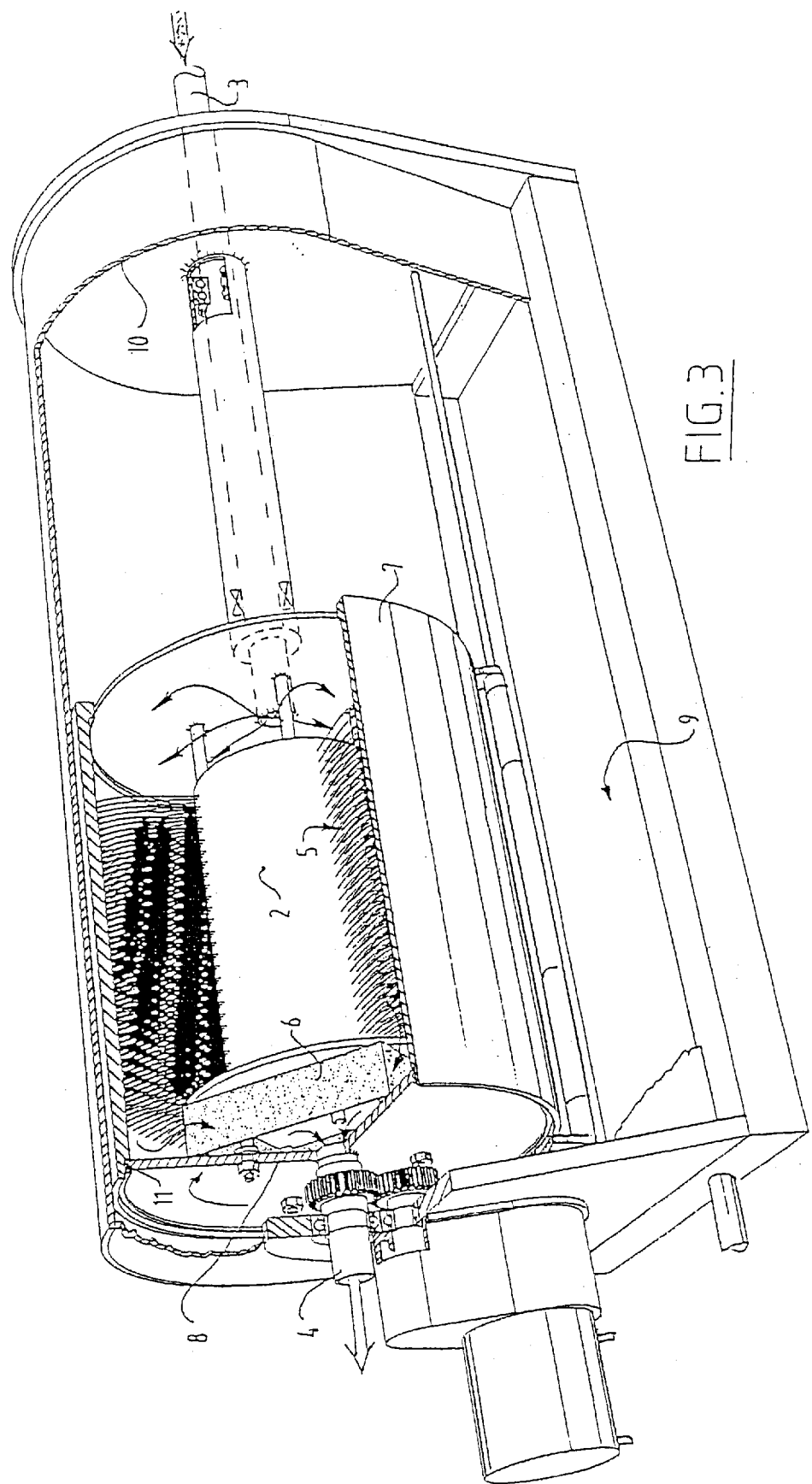
FIG. 3 shows a perspective view with partly broken-away parts of a third embodiment according to the invention.

FIG. 3 shows a third embodiment. Fixedly arranged here in the one drum part 8 is a brush-like body consisting of a carrier 2 on which flexible elements 5 are provided. The diameter of the brush-like body is larger than the inner diameter of the other drum part 7, which is arranged releasably and axially slidable on the one drum part 8. A filter device is further provided coaxially on the discharge side.

The operation of the device for removing contaminated particles from the fluid corresponds with the operation of the second embodiment.

When the device has removed so many particles from the fluid that the space between flexible elements 5 is filled and the filter device is clogged, the device is cleaned as follows.

Fluid is first sucked from drum 7, 8 back into the inlet 3. Drum part 7 is subsequently released and shifted axially by means of for instance a hydraulic cylinder, while the other parts, if desired, rotate slowly relative to drum part 7. The inner surface of drum part 7 is hereby cleaned.

When drum part 7 has been pushed fully clear (see FIG. 4), the other components are rotated at high speed, so that all particles are flung out of flexible elements and come to lie, optionally via protective hood 10, in receptacle 9. The particles clogging filter 6 are moreover also removed in this manner.

When the device has been cleaned, drum part 7 is pushed back again wherein the other components rotate slowly relative to drum part 7, whereby the contact surface for sealing edge 11 of drum part 7 is additionally cleaned by the flexible elements 5 of the brush-like carrier.

Figure 5:
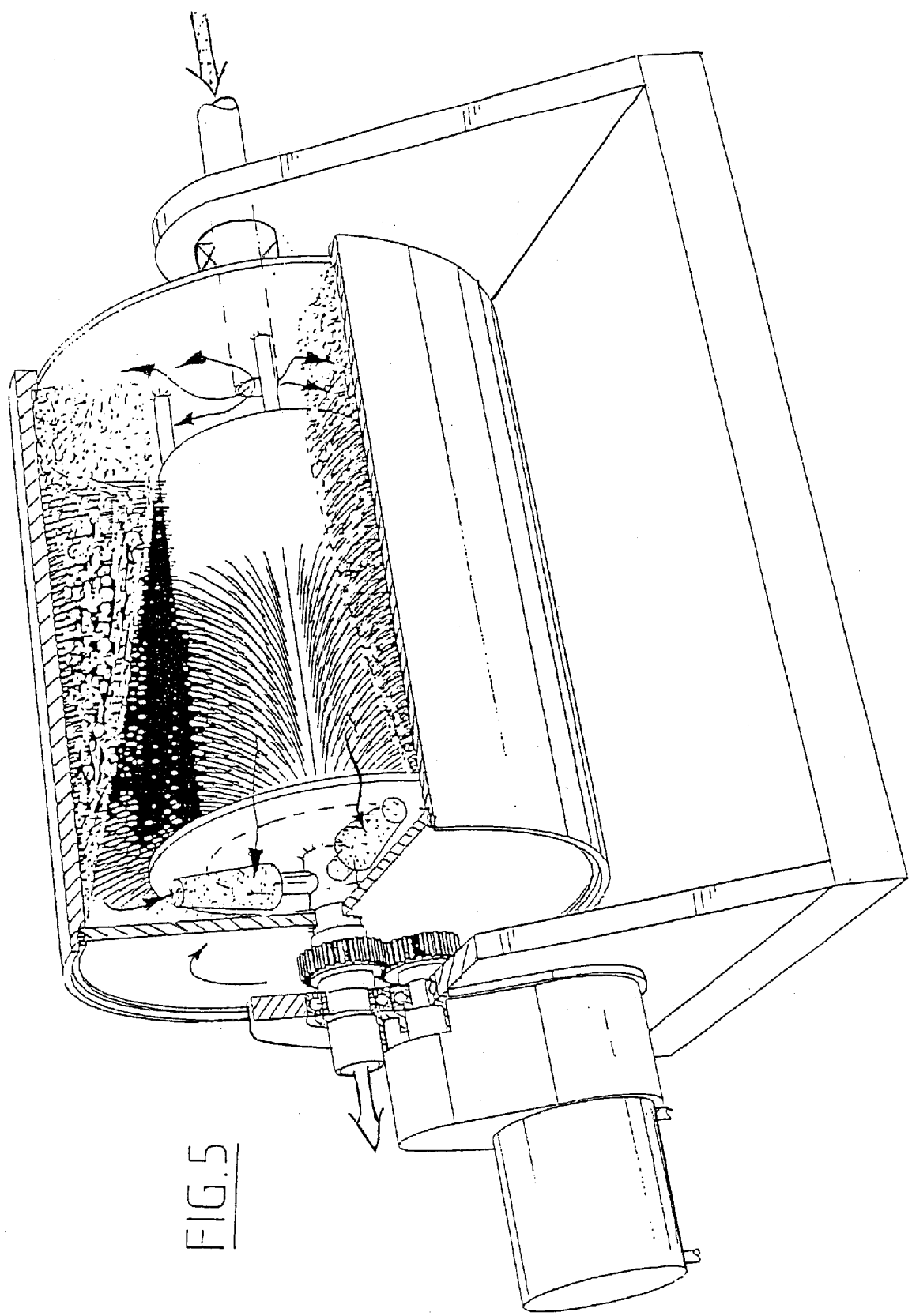
FIG. 5 shows a perspective view with partly broken-away parts of a fourth embodiment.

A variant of one of the embodiments has a filter device with radially arranged filter elements, the outer surface of which is conical (see FIG. 5). When the device fills with contaminating particles, a distribution from heavier to lighter particles will result around these filter elements from the rotation shaft to the periphery of the drum. The particles are deposited on the filter elements where particularly the lighter particles can clog the filter element. Because the elements extend radially they will become clogged from the part located furthest away from the rotation shaft towards the rotation shaft. From the moment at which it begins to clog the filter can hereby function longer than conventionally arranged filter elements.

Figure 4:
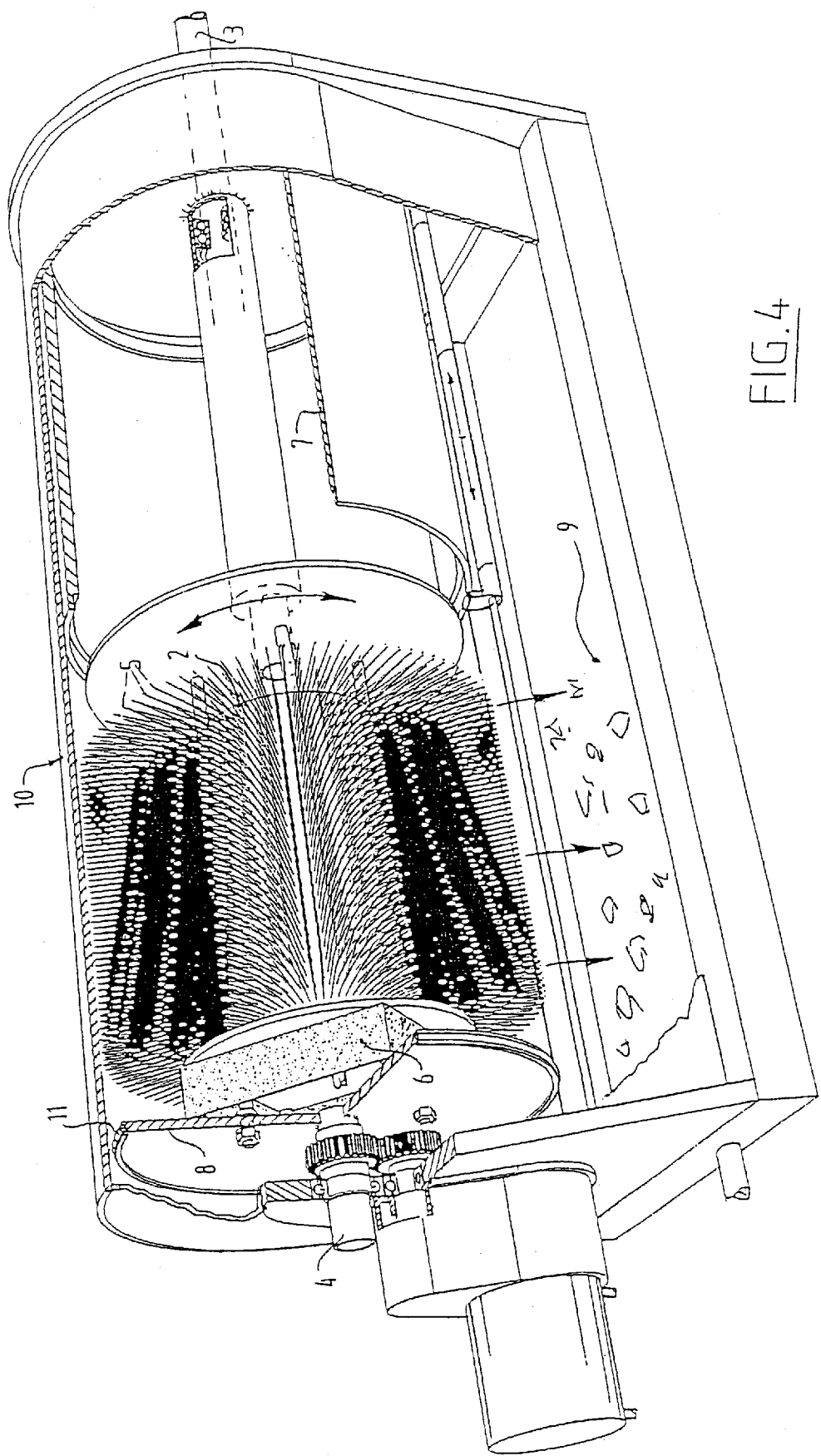
FIG. 4 is a perspective view with partly broken-away parts of the third embodiment according to the invention with released and displaced peripheral part.

The conical outer surface is particularly suitable with use of the filter elements in an embodiment as according to FIGS. 3 and 4. When the brush-like carrier is cleaned by centrifuging the filter elements with conical outer surface are also properly cleaned. This embodiment combines the advantage of cleaning the device by centrifuging and the advantages of radially arranged filter elements.

Figure 6:
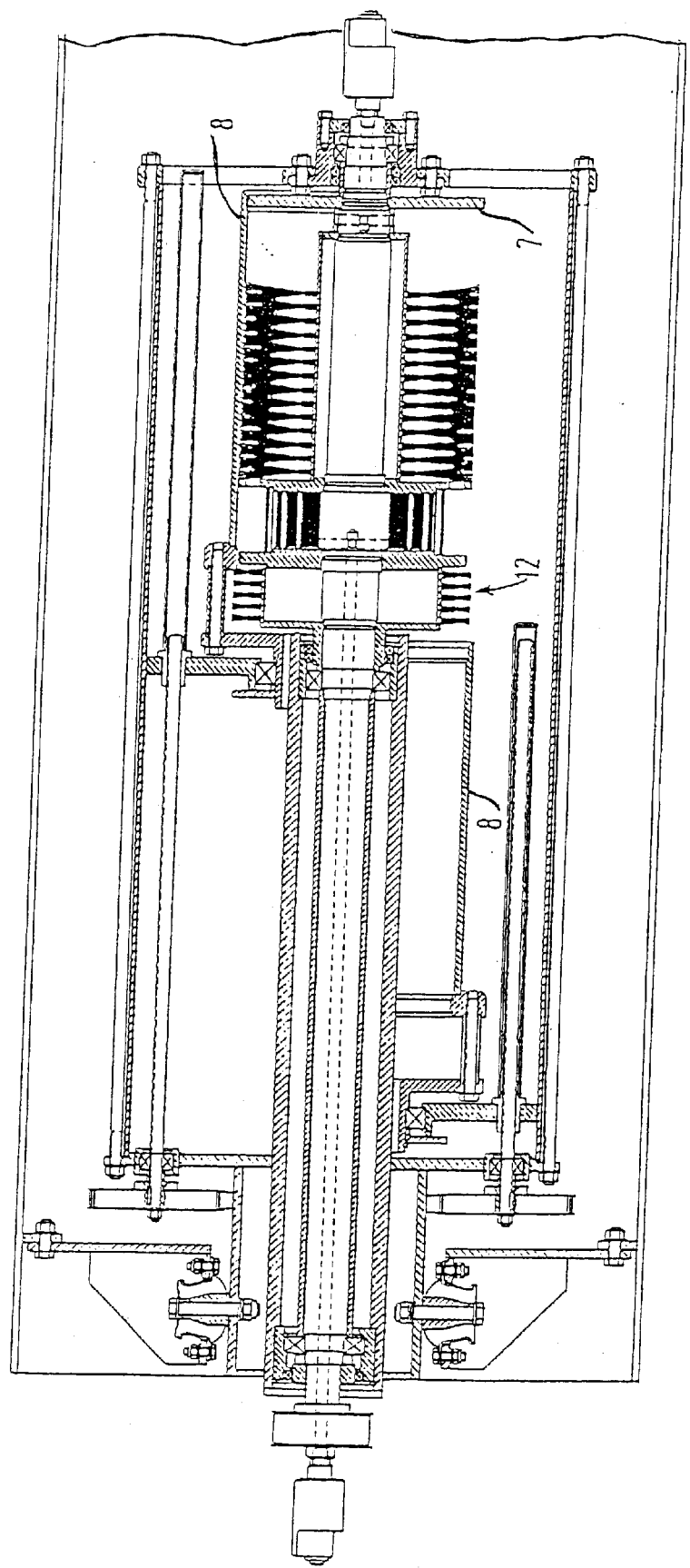
FIG. 6 shows an axial cross-section of a fifth embodiment in two positions.

FIG. 6 shows a fifth embodiment wherein drum part 7 is shown in a fully opened and a fully closed position. A separate brush 12 is arranged axially on the outside of drum 7, 8. The operation of the embodiment corresponds with the operation of the third embodiment.

When however drum part 7 is axially displaced, the whole inner surface of drum part 7, including the edges, is cleaned by the separate brush. When drum part 7 has returned to its starting position and drum 7, 8 has been brought to speed, the separate brush 12 is cleaned by the centrifugal effect.

What is claimed is:

1. A device for separating one or more components from a fluid comprising a closed drum-shaped first carrier which is rotatably driven on a rotation shaft and has feed means for feeding and respectively discharging the fluid, and a second rotating carrier arranged coaxially in the first carrier, on which the second carrier are arranged a large number of elongate flexible elements, which extend radially or practically radially from the second carrier as far as the first carrier, with the feed means provided at one end of the second carrier and the discharge means provided at the other end of the second carrier.

2. The device as claimed in claim 1, further including a filter device provided in the discharge means.

3. The device as claimed in claim 2, wherein the filter device is wholly or partially situated in the second carrier.

4. The device as claimed in claim 2, wherein the filter device comprises one or more filter elements arranged in the first carrier, and wherein each filter element has a fluid channel extending between the rotation shaft and a wall of the first carrier.

5. The device as claimed in claim 4, wherein the filter element has a conical outer surface.

6. The device as claimed in claim 1, wherein the peripheral part of the first carrier is releasable and axially displaceable.

7. The device as claimed in claim 1, wherein the second carrier with flexible elements is a brush.

8. The device as claimed in claim 7, wherein a diameter of the brush is larger than an inner diameter of the drum-shaped first carrier.

* * * * *

UNITED STATES PATENT AND TRADEMARK OFFICE
CERTIFICATE OF CORRECTION

PATENT NO. : 6,616,840 B1
DATED : September 9, 2003
INVENTOR(S) : Hendrik Arie Boele It is certified that error appears in the above-identified patent and that said Letters Patent is hereby corrected as shown below:

<u>Column 1,</u>
Line 24, delete the section heading "SUMMARY OF THE INVENTION".
Before line 30, insert the section heading -- SUMMARY OF THE INVENTION --.
Line 67, "whereby,little" should read -- whereby little --.

<u>Column 3,</u>
Line 28, before "and" insert -- 5 --.

Signed and Sealed this

Twentieth Day of January, 2004

JON W. DUDAS
*Acting Director of the United States Patent and Trademark Office*